Patented Sept. 21, 1937

2,093,660

UNITED STATES PATENT OFFICE 2,093,660

CLEANING COMPOSITION

Malcolm E. Rockhill, Washington, D. C.

No Drawing. Application May 25, 1935,
Serial No. 23,525

4 Claims. (Cl. 87—5)

This invention relates to the art of cleaning glass, metal or other highly polished surfaces. More particularly the present invention is directed to the provision of a novel cleaning composition that cleans quickly and easily and at the same time very thoroughly and without scratching. The new composition is especially well adapted for use in cleaning automobile windshields because of its efficiency and because it leaves no film on the surface of the glass to diffuse the light from the headlights of approaching cars and thus cause glare.

So many prior attempts have been made to produce compositions that will satisfactorily clean polished surfaces, such as automobile windshields, that it would be impractical to even attempt to discuss them. The compositions devised, however, have all proven more or less unsatisfactory. Some of these compositions will not remove the more tightly adherent material from the surface, others scratch, dull or even dissolve the finish either on the surface being cleaned or on contiguous painted, lacquered, or varnished surfaces, and still others require exceptional care to prevent damage or considerable physical work if the desired cleaning is to be achieved. Commonly, also, the cleaners will dry rapidly to a dust that, when automobile windshields are being cleaned, is quite a nuisance because it falls onto the cowl of the car and lodges in the crevices in the lacquer. Such crevices are rather common in the present day motor car finishes, being commonly referred to as map cracks. All of these things make the prior known compositions especially undesirable and hence there is a very real need for a more satisfactory cleaner that does not possess one or more of these disadvantages.

According to the present invention such a cleaning composition is produced, for the material about to be described is extremely simple to use and takes little physical work, yet it will quickly remove every trace of foreign material from the surface without any scratching or dimming of the surface polish. Furthermore, the cleaned surface is left without a trace of the film which invariably remains after ordinary cleaners have been used.

The fact that the new cleaner does not leave either dust or a film on the surface cleaned is of particular importance when the cleaner is used upon automobile windshields for both dust particles and films on the glass tend to diffuse the light passing through the windshield and hence greatly increase the glare caused by the headlights of approaching cars. Dust particles, if opaque tend to reflect the light and disperse it in all directions, while a film of cleaner or dust particles that are transparent are never as level and smooth as the glass itself and hence tend to refract the light passing therethrough. Furthermore, the film left by cleaners often, no matter how thin, picks up dust rapidly from the air and thus aids in causing the windshield to become clouded from the source. In not leaving a film, the present cleaner is distinctly different from other cleaners, because even a sulfonated wetting agent, used alone, will leave a microscopic film and only by the use of the combination of ingredients here set out can the occurrence of such films be avoided. A night drive behind a windshield cleaned with the new cleaner will reveal a noticeable reduction in the glare from opposing headlights. Also, if the windshield is always cleaned with the new cleaner and never with a material that scratches or dulls the polish on the glass, a very appreciable amount of glare caused by such dulling of the glass polish, will be avoided.

Basically, the new composition is a mixture of whiting, finely ground feldspar, a sulphonated wetting agent and a small amount of water. By sulfonated wetting agent is meant any organic ester of sulfuric acid or any organic sulfonic acid or any salt of these esters or acids, providing such esters, acids or salts are wetting agents.

Among the sulfonated compounds that it has been found advantageous to use, the sodium salt of the sulfuric acid ester of oleic amide and the sodium salt of sulfonated lauryl alcohol, may be cited as preferred examples for these compounds have been tried and found to be particularly satisfactory. Other sulfonated compounds, such as Turkey red oil (sulfonated castor oil) and the Gardinols (sulfonated alcohols) are also usable in this connection.

The whiting that it is preferred to use is of the variety known as water ground English Cliffstone whiting and comes from the Dover Cliffs, Dover, England. Other European and English whitings may be satisfactorily used, but the above has been found to be the finest obtainable for the intended purposes. These whitings have been found to be much superior to domestic whiting for the purpose of this invention. All of the whiting will pass through a 200 mesh sieve and substantially all through a sieve of 325 mesh.

It has been found desirable to use specially selected feldspar that contains substantially no free quartz or other such hard rock. Feldspar fulfilling these requirements can be found in certain parts of North Carolina, Maine, South Dakota and Canada. The feldspar used for the new composition is finer than that generally used in ceramics and 100% should pass a 160 mesh sieve; 98½%, a 200 mesh sieve; and 95%, a sieve of 400 mesh. When, during the cleaning operation, the cleaner is pressed against the surface to be cleaned, the feldspar, which has two planes of cleavage, appears to break along the cleavage planes into particles even smaller than the particles of whiting and becomes an unusually good cleaning and polishing material, cooperating with the wetting agent and whiting to remove all foreign material and yet not in any way scratching or marring the finish.

In preparing the cleaning composition from the ingredients described, the wetting agent is first mixed with the water at a temperature of 140° Fahrenheit, the whiting incorporated therein and the feldspar thereafter slowly added. The resultant composition hardens upon standing into a material of about the appearance of ordinary wall plaster. Usually the composition is placed in a metal can before it has time to harden and thus the cake is formed in the can.

As an example of a composition that has been found particularly satisfactory because of its efficiency in breaking down the grease films on both metal and glass, and because it has very little tendency to corrode metal containers, the following may be given:

| | Pounds |
|---|---|
| Whiting | 250 |
| Feldspar | 250 |
| Sodium salt of the sulfuric acid ester of oleic amide | 12.5 |
| Water (15 gallons) | 125 |

The sulfonated wetting agent specified is more commonly known as Igepon T. It may be prepared according to Patent 1,932,176 issued to Fritz Guenther et al., on Oct. 24, 1934, and is understood to have a structural formula of the following type:

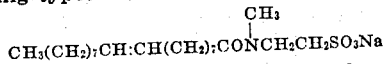

Another formula which has also been found quite satisfactory uses a product known as Dreft (sodium lauryl sulfate) as the wetting agent.

| | Pounds |
|---|---|
| Whiting | 250 |
| Feldspar | 250 |
| Sodium lauryl sulfate | 18 |
| Water | 125 |

A description of this compound and others of the same class known as Gardinols may be found in Patents 1,968,793, 1,968,794, 1,968,795, 1,968,796, and 1,968,797, all issued to Heinrich Bertsch on July 31, 1934. Any of these compounds or any other similar sulfonated wetting agents may be used. Among the compounds that may be used, mention may be made of certain products commonly known as Nekals, and described by Patent 1,715,410 granted to Karl Daimler et al. on June 4, 1929 and Patent 1,750,198 granted to Walther Schrauth on March 11, 1930.

Instead of mixing the wetting agent and water with the whiting before adding the feldspar, the process of mixing the ingredients may be modified slightly, to particular advantage when using Igepon T, and the wetting agent and water mixed with the feldspar before the whiting is added. When the process is so modified it has been found advantageous to use around 205 to 210 pounds of water in the above formulas. The resulting product is quite similar to that made by the first mentioned process but a little less difficulty is experienced with bubbles of air becoming incorporated during mixing. The cubic volume of the mixed batch remains the same but a more thorough impregnation of the solids is accomplished.

The use of the new material is extremely simple. A quantity of the material is picked up by rubbing a wet sponge or cloth over the cake a few times and the material is then applied to the surface to be cleaned by making a few strokes over it with the cloth or sponge. The cleaner is then spread over the remainder of the surface thus simultaneously cleaning and drying the object. Dust, dirt, oil, crushed insects and even exuda from trees are removed most easily.

In addition to its use in cleaning glass, such as automobile windshields, the new composition may be used for cleaning many other types of smooth or polished surfaces. The inside of a refrigerator, for example, may be expeditiously cleaned with the new material for the new cleaner readily neutralizes and removes the acid film that is normally formed there. Also, the new material may be used to clean artificial dentures and many other types of surfaces, quickly and easily and without damage either to the surface or to adjoining surfaces.

Obviously, the present invention is not limited to the use of the specific proportions of ingredients given in the examples although these proportions are distinctly preferred. Furthermore, other equivalent materials may be substituted for the whiting and feldspar although again the particular materials specified are distinctly preferred and the best results appear to be obtainable only by their use.

What I claim is:

1. A composition particularly suited for cleaning polished scratchable surfaces having approximately the following composition:

| | Pounds |
|---|---|
| Whiting | 250 |
| Feldspar about 95% of which will pass a 400 mesh sieve | 250 |
| Sodium salt of the sulfuric acid ester of oleic amide | 12.5 |
| Water | 125 |

2. A composition particularly suited for cleaning polished scratchable surfaces having approximately the following composition:

| | Pounds |
|---|---|
| Whiting | 250 |
| Feldspar about 95% of which will pass a 400 mesh sieve | 250 |
| Sodium salt of sulfonated lauryl alcohol | 18 |
| Water | 125 |

3. A composition for cleaning polished scratchable surfaces having approximately the following composition:

| | Pounds |
|---|---|
| Whiting | 250 |
| Feldspar about 95% of which will pass a 400 mesh sieve | 250 |
| The sulfuric acid ester of oleic amide | 12.5 |
| Water | 205 |

4. A composition particularly suited for cleaning polished, scratchable surfaces and having approximately the following formula:

| | Pounds |
|---|---|
| Whiting | 250 |
| Feldspar about 95% of which will pass a 400 mesh sieve | 250 |
| Organic sulfonated wetting agent | 12.5 to 18 |
| Water | 125 to 205 |

MALCOLM E. ROCKHILL.